Aug. 12, 1947.                I. W. COX                2,425,599
       FLEXIBLE, RUBBER-LIKE JACKET FOR LIQUID COOLING OF GLASS TUBES
                        Filed April 22, 1946
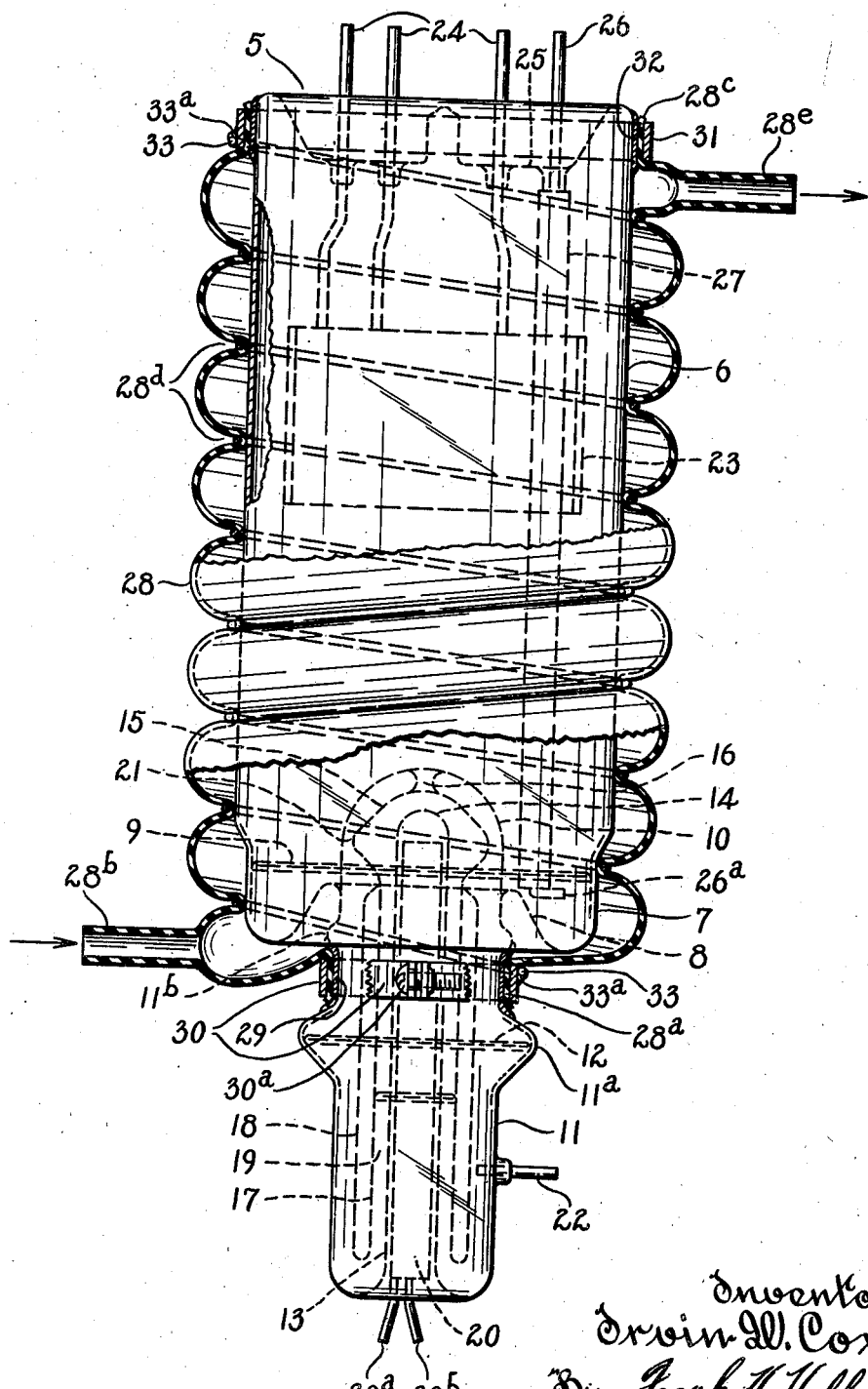
Inventor
Irvin W. Cox
By Frank H. Hubbard
Attorney Patented Aug. 12, 1947

2,425,599

UNITED STATES PATENT OFFICE 2,425,599

FLEXIBLE, RUBBERLIKE JACKET FOR LIQUID COOLING OF GLASS TUBES

Irvin W. Cox, West Allis, Wis., assignor to Cutler-Hammer, Inc., Milwaukee, Wis., a corporation of Delaware Application April 22, 1946, Serial No. 663,772

12 Claims. (Cl. 250—27.5)

This invention relates to flexible, rubber-like jackets for liquid cooling of glass tubes.

A primary object of the invention is to provide improved and simplified means for effectively cooling an all-glass tube of the mercury pool type.

Another object is to provide cooling means which may be applied as an attachment to an otherwise complete mercury pool type power tube.

Another object is to provide means for insuring a maximum degree of cooling of substantially the entire area of the tube subject to heating during operation thereof.

Another object is to provide cooling means including an envelope or jacket composed of a flexible, rubber-like material, which may be readily removed to facilitate repair or replacement thereof.

Another object is to provide an envelope of the aforementioned character which is in the form of a spiral groove within which the cooling liquid is adapted to flow in direct contact with the outer surface of the glass tube.

Another object is to provide novel means associated with the grooved envelope of rubber-like material to maintain the shape and dimensions thereof substantially constant against the pressure of the liquid flowing through the spiral groove.

Another object is to substantially increase the capacity of all-glass power tubes of the mercury pool type.

Another and more specific object is to provide a novel and efficient cooling means enabling reduction in size of an all-glass power tube of a given capacity, whereby the fragility of the tube as a whole is likewise greatly reduced.

Another object is to provide a cooling means of novel form and composition, whereby the same is adapted to act as a protective jacket for the tube associated therewith.

Other objects and advantages of the invention will hereinafter appear.

Glass has long been used in the manufacture of mercury arc rectifiers. The earlier forms thereof were, however, very large, principally because they were air cooled. This large size contributed greatly to their fragility. By adequate cooling these may, of course, be reduced in size to that essentially of the side arms and the mercury pool chamber proper, thereby greatly reducing the fragility thereof. Moreover, by proper design, enabling use of two like but separate tubes, each acting as a half-wave rectifier, the ability of these individual units to withstand shock will be still further increased.

In accordance with my invention a mercury pool tube of the single-wave rectifier type is employed; the all-glass tube being enclosed in an envelope or jacket of flexible rubber or rubber-like material; such envelope being in the form of a spiral groove, whereby a spiral flow of the cooling liquid is effected in direct contact with the outer surface of the glass tube; thus utilizing substantially the entire surface area of the glass tube to effect condensation of the mercury vapor at a temperature determined by the temperature of the cooling liquid and the relatively small temperature gradient through the wall of the glass tube.

The accompanying drawing, consisting of a single figure, illustrates a mercury pool type power tube having a preferred form of my improved cooling means applied thereto; it being understood that the invention is susceptible of embodiment in other forms within the scope of the appended claims.

In the drawing, the numeral 5 designates an all-glass mercury pool type power tube, which is, by way of example, of the character disclosed and claimed in an application, Serial No. 644,270, filed January 30, 1946, by me jointly with L. D. Drugmand, for improvements in power tubes. Tube 5 is preferably of substantially cylindrical contour from the upper end thereof throughout the major portion of its length, as indicated by numeral 6; portion 6 merging at its lower end into the intermediate reduced portion 7, and the latter having a reentrant portion, indicated in dotted lines at 8, forming part of an annular chamber for the mercury pool, the normal level of which is designated by numeral 9.

A glass hood 10 is fused to or otherwise united with the reentrant portion 8; said hood having an opening (not shown) formed in the side thereof to provide for overflow of the mercury of pool 9 into a chamber 11 forming a downward extension of substantially reduced diameter to accommodate a second body of mercury 12 which is normally mechanically and electrically separated from pool 9. The reentrant portion 8 affords an increased cooling area for the mercury pool 9.

The aforementioned reduced lower end portion 11 of the tube has a reentrant substantially cylindrical recess 13, the closed upper end of which is designated by numeral 14. A glass member having a head or enlargement 15 is attached to and supported by hood 10 at 16; a cylindrical portion 17 thereof extending downwardly throughout the major portion of the length of reentrant portion 13; and a portion 18 extending upwardly from the lower end of portion 17 in outwardly spaced relationship thereto, thus providing a heat insulating chamber between the main portion of the body of mercury 12 and the relatively thin annular portion 19 thereof located between the glass wall of recess 13 and the aforementioned cylindrical portion 17.

An electric heating element 20 of suitable form is positioned within recess 13 to effect heating and vaporization of the annular portion of mercury 19; the head 15 having a perforation at 21 to provide for ejection of the mercury vapor so produced, in the form of a downwardly angled stream or jet which passes through the aforementioned opening in hood 10 to impinge against the surface of the mercury pool 9. The circuit terminals for the heater 20 are designated by numerals 20a and 20b. The aforementioned parts and other structural features are shown and described in detail in the application, Serial No. 644,270, above referred to. Also as described in said application Serial No. 644,270, an electrode 22 is sealed into the wall of extension 11, in contact with the body of mercury 12, to provide for ionization of the jet of mercury vapor under predetermined conditions.

The circular iron anode 23 of the tube is attached to and supported by means of a plurality of terminals 24 which are sealed in the downwardly offset upper end wall 25 of tube 6. The cathode terminal 26 is likewise sealed in the upper end wall 25 of the tube; a portion of said terminal extending downwardly into the mercury pool 9, as shown at 26a. A glass tube 27 surrounds that portion of terminal 26 between the upper end wall 25 and the mercury pool 9; said tube 26 preferably being fused or otherwise peripherally united with the glass seal surrounding terminal 26, thus closing the upper end of tube 27.

Numeral 28 designates in general the jacket through which the cooling liquid, such as water, is circulated around the main body portion 6 of the evacuated tube, in direct contact with the outer surface of the latter. In practice I prefer to shape said jacket to substantially the form illustrated by depositing a layer of flexible rubber or a suitable rubber-like material to the desired thickness upon a mandrel (not shown) of corresponding shape, from which said jacket may be stripped or withdrawn after vulcanization thereof to the desired degree.

Jacket 28 is drawn or telescoped upwardly over the main body portion 6 of the tube; the reduced lower end portion 28a of jacket 28 being located between the annular ribs or bulges 11a and 11b formed upon chamber 11. A layer of a suitable heat resistant elastic or rubber-like insulating material such as those containing silicon in the molecules, as, for example, the silicones, is interposed between said reduced portion 28a and the adjacent portion of chamber 11, as indicated at 29. This layer serves to prevent any likelihood of excessive heating and consequent hardening or vulcanization of the jacket material at this point. The layer of material 29 is preferably applied to the outer surface of the glass tube, either in the form of a "rubber" band cut from a tube of suitable size, of such material, or in the form of an extruded ribbon of heat resistant rubber-like insulating material, the latter being wrapped around the periphery of the finished glass tube and then baked to provide for permanent attachment thereof to the glass tube and curing of the same to the desired rubber-consistency.

A metal clamp 30 of well known form surrounds the aforementioned reduced portion 28a of the jacket; said clamp having an adjusting screw 30a whereby the connection between portion 28a and the outer surface of chamber 11 may be made liquid-tight.

Jacket 28 has an inlet tube 28b formed thereon to provide for liquid-tight connection thereof to a pipe or conduit (not shown) through which cooling water may be supplied. As shown, jacket 28 is so shaped that the cooling water supplied travels upwardly between the same and the outer surface of portion 6 of the tube in the form of a spiral; the spiral stream of water having direct contact with the outer surface of portion 6.

As shown, jacket 28 is provided at its upper end with a vertical flange 28c which is adapted to fit closely about the periphery of the upper end of portion 6; and a metal clamping member 31 is adapted to surround the same and is adjustable, in the same manner as the aforementioned clamp 30, to provide a liquid-tight connection between the said upper end of jacket 28 and portion 6 of the tube. A layer of "Silicone rubber," or a similar heat resistant insulating material is applied to the periphery of the upper end of tube portion 6, for the purpose of protecting flange 28c, as aforedescribed.

Because of the flexibility, and consequent relative weakness or expansibility, of the peripheral wall formed by the jacket 28, I prefer to strengthen the same (to maintain essentially the flow of the cooling liquid in the form of a spiral stream) by attaching one end of a flexible wire or cord 33 to one of the clamps (say, to the clamp 31, by any suitable means. In the instant case the same is shown as consisting of a wire soldered to the clamp (as indicated at 33a). Then the wire or cord is wound under a slight degree of manual tension around the jacket 28 in a manner to fit within the spiral groove 28d formed in the outer surface of the latter, throughout the length of said groove, and attaching the other end of it to clamp 30 (as also indicated at 33a).

The spirally wound wire or cord 33 is adapted to prevent undue expansion of the jacket wall, particularly along the spiral line of contact of the wire with the latter. It is to be understood, however, that a slight degree of leakage of the water between the outer surface of portion 6 of the tube and the spiral portion of jacket 28 held most closely adjacent thereto by the wire 33 will not be objectionable; but, on the contrary, will afford substantially complete coverage of the portion 6 of the tube with cooling water; that is to say, mainly by the spirally flowing stream and partly by the relatively thin film of cooling water at the spiral area underlying wire 33. Moreover, the interposition of at least a film of water between the outer surface of tube portion 6 and the active portion of jacket 28 more positively insures against any possibility of overheating the latter at any point.

Jacket 28 is provided adjacent its upper end with a tube formation 28e, which may be connected in any suitable manner in liquid-tight relationship to an outlet pipe or conduit (not shown).

The conduit (not shown) connected with tube portion 28b is preferably provided with a pressure regulator of suitable form to prevent building up of an excessive pressure of the cooling water within the jacket 28.

Assuming that an evacuated power tube of the character herein disclosed, having my improved form of cooling water jacket applied thereto, has inlet tube 28b of said jacket connected to a source of supply of cooling water at, say, 48.2° F.; I am enabled to effect removal of 1100 watts of heat through the peripheral wall of portion 6 of a tube of substantially the same size as that of a three ampere tube of the "Thyratron" type; thereby maintaining the temperature within the glass tube as low as 136° F.; the temperature of the cooling water at the outlet 28e of jacket 28 being approximately 53.4° F.

If the rate of flow of cooling water is so reduced that, under the conditions just mentioned, the same attains a temperature of 70° at the outlet tube 28e, the temperature within portion 6 of the tube may approximate 160° F. This temperature of 160° F. is regarded as the upper extreme temperature at which a mercury pool type tube will operate satisfactorily.

With one kilowatt of heat removed by the cooling water in such a relatively small size all-glass tube, operating on 440 volts alternating current, at approximately ninety-five per cent efficiency; a pair of such tubes has a continuous duty rating of forty kilowatts, or an intermittent rating proportionately higher. In spot welding, for example, a pair of mercury pool type tubes having a cooling capacity like that just mentioned could properly supply with power a commercial spot-welder of the largest capacity in the average plant.

Although I have shown the wire 33 as one example of the means for reinforcing the jacket 28 formed of rubber or rubber-like material, other means for performing this function will at once be suggested to those skilled in the art. Thus, in lieu of wire 33, the adjacent wall portions of the spiral groove on the exterior of jacket 28 might be cemented or otherwise attached to each other for a desired portion of their height; or the rubber wall might be made substantially thicker (or filleted) along this spiral path. As a further alternative, the rubber jacket (corresponding to 28) might be initially formed without the spiral groove 28d, and the wire or cord 33 (preferably of larger caliber than that illustrated) wound spirally thereabout to afford the spiral water passage through the jacket.

As will be apparent to those skilled in the art, the jacket 28 when applied to an all-glass power tube of the mercury pool type acts as a protective covering, for the major portion of the area thereof, both during handling and shipment of the tube and during use thereof.

Although I have herein illustrated a wire attached at each end to the respective clamp members by soldering, it is to be understood that if desired integral tongues might be struck out (partially sheared) from the respective clamp members and then bent inwardly to engage and retain the ends of either the wire or cord under suitable tension.

I claim:

1. In combination, a mercury pool type discharge device comprising an all-glass evacuated tube the main body portion of which is of substantially cylindrical form, said tube having a lower end portion of substantially reduced diameter, an envelope of flexible, rubber-like material surrounding said main body portion of the tube, means for mechanically clamping one end of said envelope peripherally in liquid-tight relation to the upper end of said main body portion and means for similarly clamping the other end of said envelope to the reduced lower end portion of said tube, means comprising a wire the opposite ends of which are attached to the respective clamping means, the intermediate portion of said wire being wound in spiral form around said envelope, whereby a spiral liquid passage is formed between the latter and the main body portion of said tube from one end thereof to the other, means providing a liquid inlet at one end of said spiral passage, and means providing a liquid outlet at the other end of said spiral passage.

2. In combination, a gaseous discharge device comprising an all-glass tube the main body portion of which is of substantially cylindrical form, said tube having a lower end portion of substantially reduced diameter, an envelope of flexible, rubber-like material surrounding said main body portion of the tube, means for mechanically clamping one end of said envelope peripherally in liquid-tight relation to the upper end of said main body portion and means for similarly clamping the other end of said envelope to the reduced lower end portion of said tube, means comprising a wire the opposite ends of which are attached to the respective clamping means, the intermediate portion of said wire being wound in spiral form around said envelope, whereby a spiral liquid passage is formed between the latter and the main body portion of said tube from one end thereof to the other, means providing a liquid inlet at the lower end of said spiral passage, and means providing a liquid outlet at the upper end of said spiral passage.

3. In combination, a mercury pool type power tube comprising an all-glass tube the main body portion of which is of substantially cylindrical form, said tube having a lower end portion of reduced diameter, a sheath of molded flexible, rubber-like material into which said tube is insertable in a downward direction, said sheath having lower and upper end flanges respectively adapted to fit closely around the lower and upper end portions of said tube, said sheath being formed between said flanges to provide a spiral passage surrounding the main body portion of said tube from one end thereof to the other, a pair of adjustable metal clamping members surrounding the respective sheath flanges to hold the same in liquid-tight relation to said tube, means providing a liquid inlet at the lower end of said passage and means providing a liquid outlet at the upper end of said passage, and a wire having its opposite ends respectively attached to said clamping members and its intermediate portion wound in spiral form around said sheath, said wire acting upon said sheath to assist in maintaining said spiral passage against the pressure of liquid flowing through the latter.

4. In combination, a mercury pool type power tube comprising an all-glass tube the main body portion of which is of substantially cylindrical form, said tube having a lower end portion of reduced diameter, a sheath of molded flexible, rubber-like material into which said tube is insertable in a downward direction, said sheath having lower and upper end flanges respectively adapted to fit closely around the lower and upper end portions of said tube, said sheath being formed between said flanges to provide a spiral passage surrounding the main body portion of said tube from one end thereof to the other, a pair of adjustable metal clamping members surrounding the respective sheath flanges to hold the same in liquid-tight relation to said tube, means providing a liquid inlet at the lower end of said passage and means providing a liquid outlet at the upper end of said passage, a wire having its opposite ends respectively attached to said clamping members and its intermediate portion wound in spiral form around said sheath, said wire acting upon said sheath to assist in maintaining said spiral passage against the pressure of liquid flowing through the latter, and said sheath acting as a protective covering for said tube to minimize the liability of breakage during handling thereof or when in use.

5. As an article of manufacture, a flexible, rubber-like jacket having opposite open end portions adapted to fit closely about spaced portions of a glass tube, said open end portions being in the form of axially extending flanges adapted to be surrounded by mechanical clamping members whereby the same may be held in liquid-tight engagement with the surface of said tube, said jacket having inlet and outlet openings formed therein adjacent the respective ends thereof, and said jacket being formed to provide an internal spiral groove extending from the inlet opening to the outlet opening, whereby liquid introduced at said inlet opening is adapted to flow in the form of a spiral stream in direct contact with the surface of the tube pending discharge of the liquid at said outlet opening.

6. As an article of manufacture, a flexible, rubber-like jacket having opposite open end portions adapted to fit closely about spaced portions of a glass tube, said open end portions being in the form of axially extending flanges adapted to be surrounded by mechanical clamping members whereby the same may be held in liquid-tight engagement with the surface of said tube, said jacket having inlet and outlet openings formed therein adjacent the respective ends thereof, said jacket being formed to provide an internal spiral groove extending from the inlet opening to the outlet opening, whereby liquid introduced at said inlet opening is adapted to flow in the form of a spiral stream in direct contact with the surface of the tube pending discharge of the liquid at said outlet opening, and associated means for mechanically reinforcing the edge portions of said spiral groove most closely adjacent the surface of the glass tube, whereby excessive expansion of the jacket under a given pressure of the liquid is avoided, to thereby insure maintenance of the main portion of the liquid flow in the form of said spiral stream.

7. As an article of manufacture, a flexible, rubber-like jacket having opposite open end portions adapted to fit closely about spaced portions of an all-glass mercury pool type power tube, said open end portions being in the form of axially extending flanges adapted to be surrounded by mechanical clamping members whereby the same may be held in liquid-tight engagement with the surface of said tube, said jacket having inlet and outlet openings formed therein adjacent the respective ends thereof, and said jacket being formed to provide an internal spiral groove extending from the inlet opening to the outlet opening, whereby liquid introduced at said inlet opening is adapted to flow in the form of a spiral stream in direct contact with the surface of the tube pending discharge of the liquid at said outlet opening.

8. As an article of manufacture, a flexible, rubber-like jacket having opposite open end portions adapted to fit closely about spaced portions of an all-glass mercury pool type power tube, said open end portions being in the form of axially extending flanges adapted to be surrounded by mechanical clamping members whereby the same may be held in liquid-tight engagement with the surface of said tube, said jacket having inlet and outlet openings formed therein adjacent the respective ends thereof, said jacket being formed to provide an internal spiral groove extending from the inlet opening to the outlet opening, whereby liquid introduced at said inlet opening is adapted to flow in the form of a spiral stream in direct contact with the surface of the tube pending discharge of the liquid at said outlet opening, and associated means for mechanically reinforcing the edge portions of said spiral groove most closely adjacent the surface of the glass tube, whereby excessive expansion of the jacket under a given pressure of the liquid is avoided, to thereby insure maintenance of the main portion of the liquid flow in the form of said spiral stream.

9. As an article of manufacture, a flexible, rubber-like jacket having opposite open end portions adapted to fit closely about spaced portions of an all-glass mercury pool type power tube, said open end portions being in the form of axially extending flanges adapted to be surrounded by mechanical clamping members whereby the same may be held in liquid-tight engagement with the surface of said tube, said jacket having inlet and outlet openings formed therein adjacent the respective ends thereof, said jacket being formed to provide an internal spiral groove extending from the inlet opening to the outlet opening, whereby liquid introduced at said inlet opening is adapted to flow in the form of a spiral stream in direct contact with the surface of the tube pending discharge of the liquid at said outlet opening, and associated means for mechanically reinforcing the edge portions of said spiral groove most closely adjacent the surface of the glass tube, whereby excessive expansion of the jacket under a given pressure of the liquid is avoided, to thereby insure maintenance of the main portion of the liquid flow in the form of said spiral stream, said last mentioned means comprising a tie member attached to the respective clamping members and wound against the root of the spiral groove formed exteriorly of said jacket.

10. In combination, an all-glass mercury pool type power tube the main body portion of which is of substantially cylindrical form, said tube having a substantially reduced lower end portion of approximately cylindrical contour, a mercury pool supported at the lower end of said main body portion, a flexible, rubber-like jacket having opposite open end portions respectively adapted to fit closely about the upper end of said main body portion and an intermediate part of said reduced lower end portion, a pair of adjustable clamping members respectively surrounding said open end portions of said jacket whereby the same may be held in liquid-tight engagement with the surface of said portions of the tube, said jacket having inlet and outlet openings formed therein adjacent the lower and upper ends thereof, and said jacket being initially formed to provide an internal spiral groove communicating with said inlet and outlet openings, means for supplying a continuous flow of liquid to said inlet opening, said groove being adapted to guide said liquid in the form of a spiral stream in direct contact with the surface of the tube during its passage between said inlet and outlet openings.

11. In combination, a mercury pool type power tube comprising an all-glass tube the main body portion of which is of substantially cylindrical form, said tube having a lower end portion of reduced diameter, a sheath of molded flexible, rubber-like material into which said tube is insertable, said sheath having lower and upper end flanges respectively adapted to fit closely around the lower and upper end portions of said tube, said sheath being formed between said flanges to provide a spiral passage surrounding the main body portion of said tube from one end thereof to the other, a pair of adjustable clamping members surrounding the respective sheath flanges to hold the same in liquid-tight relation to said tube, a layer of heat resistant rubber-like insulating material interposed between each sheath flange and the adjacent peripheral wall portion of the tube, for the purpose set forth, means providing a liquid inlet at the lower end of said spiral passage, and means providing a liquid outlet at the upper end of said passage.

12. In a liquid cooling device of the character described, in combination, a glass tube of circular form in transverse cross section, a flexible, rubber-like jacket having open end portions adapted to fit closely about spaced portions of said tube, said open end portions being in the form of axially extending flanges adapted to be surrounded by mechanical clamping members whereby the same may be held in liquid-tight engagement with said portions of the tube, said jacket having inlet and outlet openings formed therein adjacent the respective ends thereof, said jacket being formed to provide an internal spiral groove extending from the inlet opening to the outlet opening, whereby liquid introduced at said inlet opening is adapted to flow in the form of a spiral stream in direct contact with the surface of the tube pending discharge of the liquid at said outlet opening, and means comprising a layer of heat resistant rubber-like insulating material interposed between each of said axially extending flanges and the adjacent spaced peripheral wall portions of said tube, to minimize the transfer of heat from said tube to the respective flanges.

IRVIN W. COX.